(12) United States Patent
Walden

(10) Patent No.: US 7,424,040 B2
(45) Date of Patent: Sep. 9, 2008

(54) COMMUNICATION SYSTEMS AND METHODS FOR TRANSMITTING DATA IN PARALLEL OVER MULTIPLE CHANNELS

(75) Inventor: Michael K. Walden, North Las Vegas, NV (US)

(73) Assignee: LTAS Holdings, LLC, North Las Vegas, NV (US)

( * ) Notice: Subject to any disclaimer, the term of this patent is extended or adjusted under 35 U.S.C. 154(b) by 656 days.

(21) Appl. No.: 10/842,038

(22) Filed: May 7, 2004

(65) Prior Publication Data

US 2005/0249236 A1  Nov. 10, 2005

(51) Int. Cl.
*H04J 3/04* (2006.01)
(52) U.S. Cl. .......................... 370/536; 714/746
(58) Field of Classification Search .............. None
See application file for complete search history.

(56) References Cited

U.S. PATENT DOCUMENTS

| | | | |
|---|---|---|---|
| 5,303,261 A | | 4/1994 | Junod et al. |
| 5,471,503 A | * | 11/1995 | Altmaier et al. ............ 375/133 |
| 5,663,986 A | * | 9/1997 | Striffler ..................... 375/260 |
| 5,678,783 A | | 10/1997 | Wong |
| 5,694,414 A | | 12/1997 | Smith et al. |
| 5,719,883 A | * | 2/1998 | Ayanoglu ................... 370/480 |
| 5,832,091 A | * | 11/1998 | Tomko et al. .............. 713/186 |
| 5,912,396 A | | 6/1999 | Wong |
| 5,974,317 A | | 10/1999 | Djuknic et al. |
| 5,982,337 A | | 11/1999 | Newman et al. |
| 6,010,093 A | | 1/2000 | Paulson |
| 6,052,365 A | | 4/2000 | Bhagalia et al. |
| 6,072,787 A | | 6/2000 | Hamalainen et al. |
| 6,078,289 A | | 6/2000 | Manoogian et al. |
| 6,148,209 A | | 11/2000 | Hamalainen et al. |
| 6,151,308 A | | 11/2000 | Ibanez-Meier et al. |
| 6,167,263 A | | 12/2000 | Campbell |
| 6,173,332 B1 | | 1/2001 | Hickman |
| 6,175,550 B1 | * | 1/2001 | van Nee ..................... 370/206 |
| 6,205,320 B1 | | 3/2001 | Coleman |
| 6,293,493 B1 | | 9/2001 | Eichstedt et al. |
| 6,305,641 B1 | | 10/2001 | Onda |
| 6,354,535 B1 | | 3/2002 | Perry et al. |
| 6,380,893 B1 | | 4/2002 | Chang et al. |
| 6,386,480 B1 | | 5/2002 | Perry et al. |
| 6,404,821 B1 | * | 6/2002 | Dent ......................... 375/267 |
| 6,421,372 B1 | | 7/2002 | Bierly et al. |
| 6,425,552 B1 | | 7/2002 | Lee et al. |
| 6,427,943 B2 | | 8/2002 | Yokomaku et al. |
| 6,441,792 B1 | | 8/2002 | Sievenpiper et al. |
| 6,459,403 B1 | | 10/2002 | Nakahara et al. |
| 6,507,314 B2 | | 1/2003 | Chang et al. |
| 6,540,178 B1 | | 4/2003 | Hillsdon |
| 6,581,178 B1 | * | 6/2003 | Kondo ....................... 714/758 |
| 6,608,861 B1 | | 8/2003 | D'Amico |
| 6,618,395 B1 | | 9/2003 | Kimmitt |
| 6,684,363 B1 | * | 1/2004 | Cassiday et al. ............ 714/776 |
| 6,986,092 B2 | * | 1/2006 | Butler et al. ............... 714/752 |
| 2002/0002063 A1 | | 1/2002 | Miyamoto et al. |

(Continued)

*Primary Examiner*—Anh-Vu H Ly
(74) *Attorney, Agent, or Firm*—Snell & Wilmer L.L.P.

(57) ABSTRACT

A method for simultaneously transmitting data bits using multiple channels. The method may include receiving a plurality of source data bits, arranging the plurality of source data bits so that adjacent source data bits are to be transmitted on a different channel and transmitting the plurality of source data bits on a plurality of channels.

24 Claims, 14 Drawing Sheets

U.S. PATENT DOCUMENTS

| | | |
|---|---|---|
| 2002/0032853 A1 | 3/2002 | Preston et al. |
| 2003/0033452 A1* | 2/2003 | Himmel et al. ............. 709/327 |
| 2004/0120300 A1* | 6/2004 | Saquib ....................... 370/342 |
| 2005/0190913 A1* | 9/2005 | Wada et al. ................... 380/44 |
| 2005/0193193 A1* | 9/2005 | Skovira ...................... 713/160 |

* cited by examiner

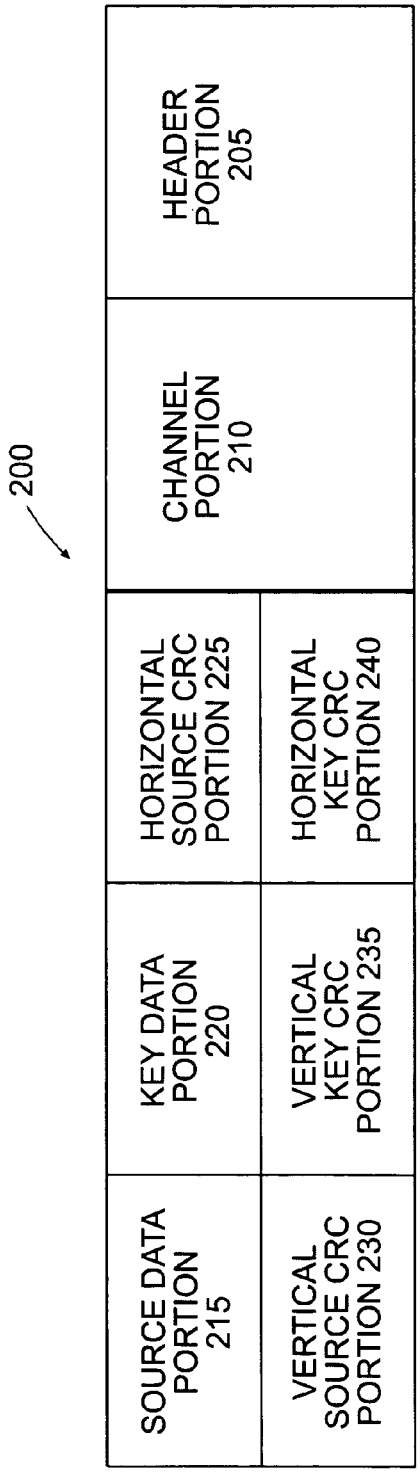
Fig. 2
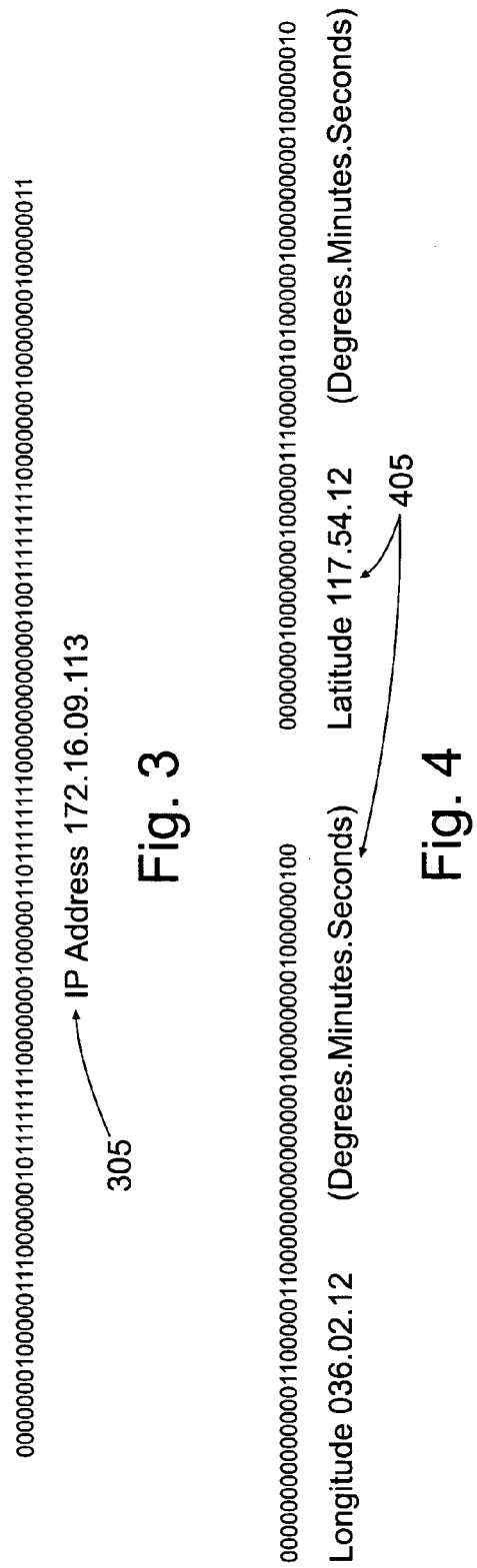
Fig. 3
Fig. 4

```
Channel Bits are 16 rows by 8 columns.                210
Channel Bits are mapped in horizontally.            ┌──┴──┐
                                                    msb→lsb
         00000000000000000000000000000000000000000000000000xxxxxxxx
         00000000000000000000000000000000000000000000000000xxxxxxxx
         00000000000000000000000000000000000000000000000000xxxxxxxx
         00000000000000000000000000000000000000000000000000xxxxxxxx
         00000000000000000000000000000000000000000000000000xxxxxxxx
         00000000000000000000000000000000000000000000000000xxxxxxxx
         00000000000000000000000000000000000000000000000000xxxxxxxx
         00000000000000000000000000000000000000000000000000xxxxxxxx
         00000000000000000000000000000000000000000000000000xxxxxxxx
      ↗  00000000000000000000000000000000000000000000000000xxxxxxxx
 200     00000000000000000000000000000000000000000000000000xxxxxxxx
         00000000000000000000000000000000000000000000000000xxxxxxxx
         00000000000000000000000000000000000000000000000000xxxxxxxx
         00000000000000000000000000000000000000000000000000xxxxxxxx
         00000000000000000000000000000000000000000000000000xxxxxxxx
         00000000000000000000000000000000000000000000000000xxxxxxxx
                                                          49    56
```

Fig. 5

```
Source Data 8 rows by 16 columns.
Source Data Bits are mapped in vertically.
         1              16
     ┌ msb xxxxxxxxxxxxxxxx0000000000000000000000000000000000000000
     │     xxxxxxxxxxxxxxxx0000000000000000000000000000000000000000
     │     xxxxxxxxxxxxxxxx0000000000000000000000000000000000000000
 215 │     xxxxxxxxxxxxxxxx0000000000000000000000000000000000000000
     │     xxxxxxxxxxxxxxxx0000000000000000000000000000000000000000
     │     xxxxxxxxxxxxxxxx0000000000000000000000000000000000000000
     │ ↓   xxxxxxxxxxxxxxxx0000000000000000000000000000000000000000
     └ lsb xxxxxxxxxxxxxxxx0000000000000000000000000000000000000000
           0000000000000000000000000000000000000000000000000000000000
           0000000000000000000000000000000000000000000000000000000000
           0000000000000000000000000000000000000000000000000000000000
           0000000000000000000000000000000000000000000000000000000000
           0000000000000000000000000000000000000000000000000000000000
       ↗   0000000000000000000000000000000000000000000000000000000000
 200       0000000000000000000000000000000000000000000000000000000000
           0000000000000000000000000000000000000000000000000000000000
```

Fig. 6A

```
Source Data CRC's 8 rows by 16 columns.
Source Data CRC's are mapped in vertically.
         1              16
           0000000000000000000000000000000000000000000000000000000000
           0000000000000000000000000000000000000000000000000000000000
      ↗    0000000000000000000000000000000000000000000000000000000000
 200       0000000000000000000000000000000000000000000000000000000000
           0000000000000000000000000000000000000000000000000000000000
           0000000000000000000000000000000000000000000000000000000000
           0000000000000000000000000000000000000000000000000000000000
           0000000000000000000000000000000000000000000000000000000000
     ┌ msb xxxxxxxxxxxxxxxx0000000000000000000000000000000000000000
     │     xxxxxxxxxxxxxxxx0000000000000000000000000000000000000000
     │     xxxxxxxxxxxxxxxx0000000000000000000000000000000000000000
 230 │     xxxxxxxxxxxxxxxx0000000000000000000000000000000000000000
     │     xxxxxxxxxxxxxxxx0000000000000000000000000000000000000000
     │     xxxxxxxxxxxxxxxx0000000000000000000000000000000000000000
     │ ↓   xxxxxxxxxxxxxxxx0000000000000000000000000000000000000000
     └ lsb xxxxxxxxxxxxxxxx0000000000000000000000000000000000000000
```

Fig. 7A

Hello - Text source message vertically coded Channels 0-7

Hello - Source Vertical CRC encoding Channels 8-15

230
```
00000 0000000000000000000000000000000000000000000000000 v
11111 0000000000000000000000000000000000000000000000000 v
01111 0000000000000000000000000000000000000000000000000 v
00000 0000000000000000000000000000000000000000000000000 v
10111 0000000000000000000000000000000000000000000000000 v
01111 0000000000000000000000000000000000000000000000000 v
00001 0000000000000000000000000000000000000000000000000 v
01001 0000000000000000000000000000000000000000000000000 v
```

A direct bit Vertical compare will be done to check for
Source errors.

Fig. 7B

Hello - Source Horizontal CRC encoding Channels 0-7

225
```
00000 00000000 00000 0000000000000000000000000000000000 <
11111 00000000 11111 0000000000000000000000000000000000 <
01111 00K00000 01111 0000000000000000000000000000000000 <
00000 00E00000 00000 0000000000000000000000000000000000 <
10111 00Y00000 10111 0000000000000000000000000000000000 <
01111 00000000 01111 0000000000000000000000000000000000 <
00001 00000000 00001 0000000000000000000000000000000000 <
01001 00000000 01001 0000000000000000000000000000000000 <
```

A direct bit Horizontal compare will be done to check for
source errors.

Fig. 8B

Source Data CRC's 8 rows by 16 columns.
Source Data CRC's are mapped in horizontally.

Key Data Bits are 8 rows by 16 columns.
Key Data Bits are mapped in vertically.

|   | Source<br>Encrypted 215 | Key<br>220 | Source<br>HZ CRC 225 | Channel<br>Data 210 |
|---|---|---|---|---|
| 1300 | 11111 | 00000000000 00100 | 00000000000 11111 | 00000000000 00000000 |
|   | 11100 | 00000000000 00110 | 00000000000 00110 | 00000000000 00001100 |
|   | 00111 | 00000000000 11010 | 00000000000 11010 | 00000000000 00001010 |
|   | 00101 | 00000000000 00010 | 00000000000 00010 | 00000000000 00001011 |
|   | 00100 | 00000000000 00001 | 00000000000 00001 | 00000000000 00001001 |
|   | 00101 | 00000000000 00010 | 00000000000 00101 | 00000000000 00000011 |
|   | 11100 | 00000000000 10101 | 00000000000 10101 | 00000000000 00001111 |
|   | 11100 | 00000000000 00110 | 00000000000 11100 | 00000000000 00000100 |
|   |   |   |   |   |
|   | 00010 | 00000000000 01100 | 00000000000 00010 | 00000000000 00000101 |
|   | 00100 | 00000000000 00001 | 00000000000 00100 | 00000000000 00000001 |
|   | 11100 | 00000000000 10101 | 00000000000 11100 | 00000000000 00000111 |
|   | 00011 | 00000000000 01100 | 00000000000 01100 | 00000000000 00001101 |
|   | 11111 | 00000000000 00100 | 00000000000 00100 | 00000000000 00001000 |
|   | 00011 | 00000000000 00011 | 00000000000 00011 | 00000000000 00000110 |
|   | 00011 | 00000000000 11010 | 00000000000 00111 | 00000000000 00000010 |
|   | 00011 | 00000000000 00011 | 00000000000 00011 | 00000000000 00001110 |
|   | Source<br>VT CRC 230 | Key<br>VT CRC 235 | Key<br>HZ CRC 240 | Channel<br>Data 210 |

Fig. 13

|   | Source<br>Encrypted 215 | Key<br>220 | Source<br>HZ CRC 225 | Channel<br>Data 210 |
|---|---|---|---|---|
|   | 11111 | 00000000000 00100 | 00000000000 11111 | 00000000000 00000000 |
| Error Detected (2,2) | 00100 | 00000000000 00001 | 00000000000 00100 | 00000000000 00000001 |
|   | 00011 | 00000000000 11010 | 00000000000 00111 | 00000000000 00000010 |
|   | 00101 | 00000000000 00010 | 00000000000 00101 | 00000000000 00000011 |
|   | 11100 | 00000000000 00110 | 00000000000 11100 | 00000000000 00000100 |
|   | 00010 | 00000000000 01100 | 00000000000 00010 | 00000000000 00000101 |
|   | 00011 | 00000000000 00011 | 00000000000 00011 | 00000000000 00000110 |
| Error Detected (6,18) | 11100 | 00000000000 10101 | 00000000000 11100 | 00000000000 00000111 |
|   | 11111 | 00000000000 00100 | 00000000000 00100 | 00000000000 00001000 |
|   | 00100 | 00000000000 00001 | 00000000000 00001 | 00000000000 00001001 |
| Error Detected (13,4) | 00111 | 00000000000 11010 | 00000000000 11010 | 00000000000 00001010 |
|   | 00101 | 00000000000 00010 | 00000000000 00010 | 00000000000 00001011 |
|   | 11100 | 00000000000 00110 | 00000000000 00110 | 00000000000 00001100 |
|   | 00011 | 00000000000 01100 | 00000000000 01100 | 00000000000 00001101 |
|   | 00011 | 00000000000 00011 | 00000000000 00011 | 00000000000 00001110 |
|   | 11100 | 00000000000 10101 | 00000000000 10101 | 00000000000 00001111 |
|   | Source<br>VT CRC 230 | Key<br>VT CRC 235 | Key<br>HZ CRC 240 | Channel<br>Data 210 |

Fig. 14

Error
Corrected

Error
Corrected

| Source Encrypted 215 | Key 220 | Source HZ CRC 225 | Channel Data 210 |
|---|---|---|---|
| 11111 00000000000 | 00100 00000000000 | 11111 00000000000 | 00000000 |
| 00100 00000000000 | 00001 00000000000 | 00100 00000000000 | 00000001 |
| 00[1]11 00000000000 | 11010 00000000000 | 00111 00000000000 | 00000010 |
| 00101 00000000000 | 00010 00000000000 | 00101 00000000000 | 00000011 |
| 11100 00000000000 | 00110 00000000000 | 11100 00000000000 | 00000100 |
| 00010 00000000000 | 01100 00000000000 | 00010 00000000000 | 00000101 |
| 00011 00000000000 | 00011 00000000000 | 00011 00000000000 | 00000110 |
| 11100 00000000000 | 10101 00000000000 | 11100 00000000000 | 00000111 |
| | | | |
| 11111 00000000000 | 00100 00000000000 | 00100 00000000000 | 00001000 |
| 00100 00000000000 | 00001 00000000000 | 00001 00000000000 | 00001001 |
| 00111 00000000000 | 11010 00000000000 | 11010 00000000000 | 00001010 |
| 00101 00000000000 | 00010 00000000000 | 00010 00000000000 | 00001011 |
| 11100 00000000000 | 00110 00000000000 | 00110 00000000000 | 00001100 |
| 0001⚠ 00000000000 | 01100 00000000000 | 01100 00000000000 | 00001101 |
| 00011 00000000000 | 00011 00000000000 | 00011 00000000000 | 00001110 |
| 11100 00000000000 | 10101 00000000000 | 10101 00000000000 | 00001111 |
| Source VT CRC 230 | Key VT CRC 235 | Key HZ CRC 240 | Channel Data 210 |

Error
Not
Corrected

Fig. 15

COMMUNICATION SYSTEMS AND METHODS FOR TRANSMITTING DATA IN PARALLEL OVER MULTIPLE CHANNELS

FIELD OF THE INVENTION

The invention relates generally to systems and methods for transmitting data, and more particularly to communication systems and methods for transmitting data in parallel over multiple channels.

BACKGROUND OF THE INVENTION

Communication systems include a transmitter and a receiver that communicate information over a link that carries the information. The link may be wireless (e.g., electromagnetic radiation (such as radio frequency), electro-optical signals, infrared signals, etc.), or physical (e.g., ADSL, power line communications, fiber optic signals, etc.). In a wireless communication system, the transmitter may be a mobile device and the receiver may be a base station or a cellular tower, and vice versa. Also, the transmitter and the receiver may be the same, for example, they both may be mobile devices or base stations. The base station may be positioned on a moving vehicle such as an aircraft, airship, blimp, spaceship or satellite. Generally, the transmitter sends a communication frame or data packet to the receiver on a single channel. Hence, each communication frame is serialized over a single channel. Each channel corresponds to a particular frequency. Present communication systems are configured to carry the information on a single channel at a time.

Frequency hopping is a technique that allows the wireless communication system to transfer data using multiple channels. In particular, frequency hopping allows the transmitter and the receiver to simultaneously "hop" to a single available channel to transmit and receive the data. The purpose of frequency hopping is to allow multiple devices to share a channel for the communication of information. Frequency hopping also allows the wireless communication system to scramble the data by serially transmitting and receiving communications using multiple channels. For example, a first channel can be used to transmit a first communication frame, a second channel can be used to transmit a second communication frame and so on. In frequency hopping systems, the channel or frequency of transmission may change at predetermined time intervals or in a pseudorandom manner. For example, the receiver may contain an algorithm that changes to the next frequency at essentially the same time as the transmitter without receiving successive frequency change information from the transmitter. Alternatively, the transmitter may include a pseudorandom number generator for generating a pattern of numbers that change the carrier frequency. The pattern of numbers is predictable from a relatively small set of defined values that are communicated to or predetermined within the receiver. The transmitter and the receiver are capable of operating in a number of frequencies and in a number of frequency bands, making use of spread-spectrum and narrowband communication techniques.

One drawback of conventional wireless communication systems is the difficulty in achieving high data transfer rates. This is partly because conventional wireless communication systems send data serially along a single channel. For example, the transmitter may send a byte or frame of data in a serial manner on a single channel to the receiver. Thereafter, the transmitter may send another byte or frame of data in a serial manner on another channel to the receiver. The transfer rates are limited because the receiver generally receives only one bit, byte or frame of information at a time. Some methods of achieving high data transfer rates include increasing the compression rate and increasing the frequency of transmission. These methods, however, still provide limitations as to the speed at which the data can be transmitted serially.

Another drawback of conventional wireless communication systems is the difficulty in correcting multiple bit errors at the receiver. When data is transmitted, errors in the data may occur from channel interference, drops in signal strength, loss in transmission, as well as other factors. These errors may be corrected using an error correction technique, such as cyclic redundancy check (CRC), which places a CRC packet at the end of the entire data packet. However, before any errors in the data packet can be identified, the entire data packet, including the CRC packet, must be received by the receiver. Once the entire data packet is received, the receiver can correct errors in the data packet but cannot correct errors in the CRC packet. Hence, any errors identified in the CRC packet requires retransmission of the entire data packet, including the CRC packet.

Thus, it should be appreciated that there is a need for a wireless communication system that achieves high data transfer rates and provides error correction of the CRC packet without retransmission of the data. The invention fulfills this need as well as others.

SUMMARY OF THE INVENTION

One embodiment of the invention is a method for simultaneously transmitting data bits using multiple channels. The method may include receiving a plurality of source data bits, arranging the plurality of source data bits so that adjacent source data bits are to be transmitted on a different channel and transmitting the plurality of source data bits on a plurality of channels.

One embodiment of the invention is a method for multi-link communications. The method includes receiving a plurality of serial data bits, arranging the plurality of serial data bits into a source data portion, copying the source data portion to form a vertical source crc portion and copying the source data portion to form a horizontal source crc portion. The method also includes transmitting the source data portion using a plurality of first links, transmitting the vertical source crc portion using a plurality of second links and transmitting the horizontal source crc portion using the plurality of first links.

One embodiment of the invention is a transmitter for concurrent multi-channel wireless communications. The transmitter includes a plurality of antennas, a plurality of chip radios connected to the plurality of antennas and a processor, connected to the plurality of chip radios, for receiving a serial stream of data bits and for arranging the serial stream of data bits so that adjacent data bits are sent to a different chip radio.

These and other features and advantages of the embodiments of the invention will become apparent from the following detailed description, taken in conjunction with the accompanying drawings, which illustrate, by way of example the principles of the invention.

BRIEF DESCRIPTION OF THE DRAWINGS

FIG. 2 is a block diagram of a data block that contains data bits that are stored contiguously and/or non-contiguously in the cache memory according to an embodiment of the invention;

FIG. 3 is a stream of data bits representing the IP address of the receiver according to an embodiment of the invention;

FIG. 4 is a stream of data bits representing the GPS position of the transceiver according to an embodiment of the invention;

FIG. 5 is a simplified representation of the data block of FIG. 2, without the header portion, to illustrate the channel portion according to an embodiment of the invention;

FIG. 6A is a simplified representation of the data block of FIG. 2, without the header portion, to illustrate the source data portion according to an embodiment of the invention;

FIG. 6B is a simplified representation of the data block of FIG. 2, without the header portion, to illustrate an exemplary source data portion according to an embodiment of the invention;

FIG. 7A is a simplified representation of the data block of FIG. 2, without the header portion, to illustrate the vertical source crc portion according to an embodiment of the invention;

FIG. 7B is a simplified representation of the data block of FIG. 2, without the header portion, to illustrate an exemplary vertical source crc portion according to an embodiment of the invention;

FIG. 8B is a simplified representation of the data block of FIG. 2, without the header portion, to illustrate an exemplary horizontal source crc portion according to an embodiment of the invention;

FIG. 13 is a simplified representation of a data block, without the header portion, as received by the receiver to illustrate the channels being in a random sequence according to an embodiment of the invention;

FIG. 14 is a simplified representation of the data block of FIG. 13 rearranged according to channel number and showing the errors detected by the bit-by-bit comparison according to an embodiment of the invention;

FIG. 15 is a simplified representation of the data block of FIG. 14 showing the errors corrected according to an embodiment of the invention.

DETAILED DESCRIPTION OF THE PRESENTLY PREFERRED EMBODIMENTS

Systems and methods that implement the embodiments of the various features of the invention will now be described with reference to the drawings. The drawings and the associated descriptions are provided to illustrate embodiments of the invention and not to limit the scope of the invention. Reference in the specification to "an embodiment", "one embodiment" or "illustrated embodiment" is intended to indicate that a particular feature, structure, or characteristic described in connection with the embodiment is included in at least an embodiment of the invention. The appearances of the phrase "an embodiment", "one embodiment" or "illustrated embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1A:
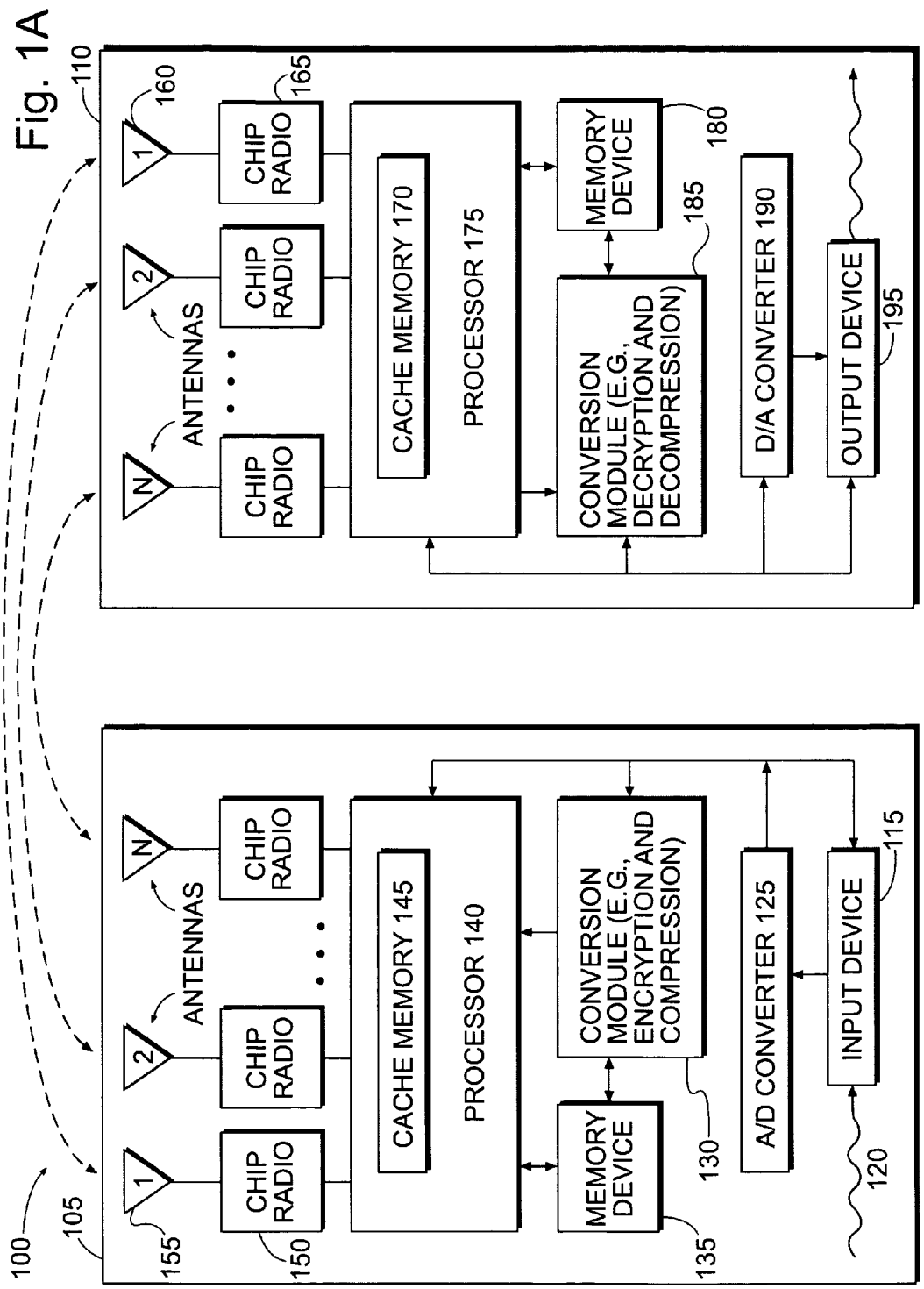
FIG. 1A is a block diagram of a communication system capable of transmitting and/or receiving signals on multiple channels at the same time according to an embodiment of the invention.

Referring now more particularly to the drawings, FIG. 1A is a block diagram of a communication system 100 capable of propagating (e.g., transmitting and/or receiving) signals on multiple channels at the same time. The term "signal" may refer to a number of data bits, for example, a stream of data bits or any definition known to those skilled in the art. The communication system 100 includes a transmitter 105 and a receiver 110, both of which are capable of operating in a number of frequencies, frequency bands and modes using narrow band, wide band or spread-spectrum communication techniques. The various modes may occupy common frequency bands, overlapping frequency bands, or distinct, offset frequency bands. The transmitter 105 and the receiver 110 may operate using frequency division multiple access (FDMA), code division multiple access (CDMA), time division multiple access (TDMA), other types of communication or various combinations thereof. The transmitter 105 and the receiver 110 may be embodied in hand-held devices (e.g., cellular telephones), base stations, mobile-wireless devices, material linked computer networking and broadcast services or communications equipment. The transmitter 105 and the receiver 110 may be transceivers capable of both transmitting and receiving data.

Figure 1B:
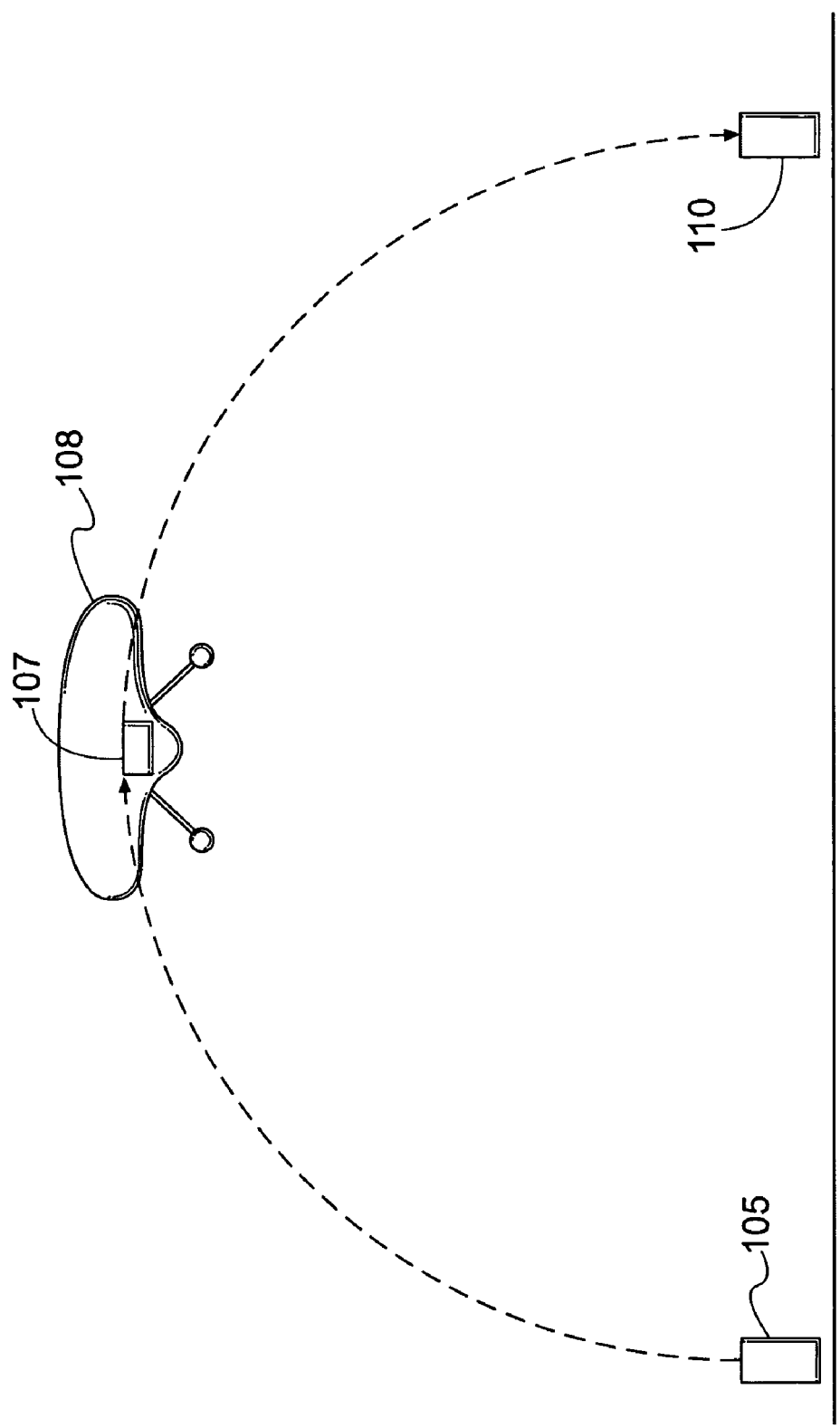
FIG. 1B is a block diagram illustrating the communication system including the transmitter, a transceiver, and the receiver according to an embodiment of the invention.

FIG. 1B is a block diagram illustrating the communication system 100 including the transmitter 105, a transceiver 107, and the receiver 110. The transmitter 105 encrypts the signal and generates a first key, and then sends the signal to the transceiver 107, which decrypts the signal using the first key and/or error corrects the signal. Then, the transceiver 107 encrypts the signal and generates a second key, and then sends the signal to the receiver 110, which decrypts the signal using the second key and/or error corrects the signal. The encryption and decryption process can be repeated using a number of keys and a number of transmitters 105, transceivers 107 and/or receivers 110. For example, the communication system 100 can include multiple transceivers, all of which are capable of compressing, encrypting, sending, receiving, decompressing, decrypting and error correcting signals. In one embodiment, the transmitter 105 and the receiver 110 are mobile wireless devices such as cellular telephones. In one embodiment, the transceiver 107 is a base station located on an airship 108 that maybe positioned at a fixed or moving location above the transmitter 105 and the receiver 110. In one embodiment, the airship 108 is in a geo-stationary orbit at an altitude of between about 1,000 feet and about 100,000 feet and preferably between about 60,000 feet and about 100,000 feet. The airship 108 can also be positioned at any feasible altitudes. Generally, the higher the altitude of the airship, the larger the signal footprint. The transceiver 107 may include some or all of the components and features of the transmitter 105 and the receiver 110. In one embodiment, the transmitter 105 and/or the receiver 110 can be a part of the transceiver 107. The transmitter 105 may include an input device 115, an analog-to-digital (A/D) converter 125, a conversion module 130, a memory device 135 and a processor 140.

Figure 1C:
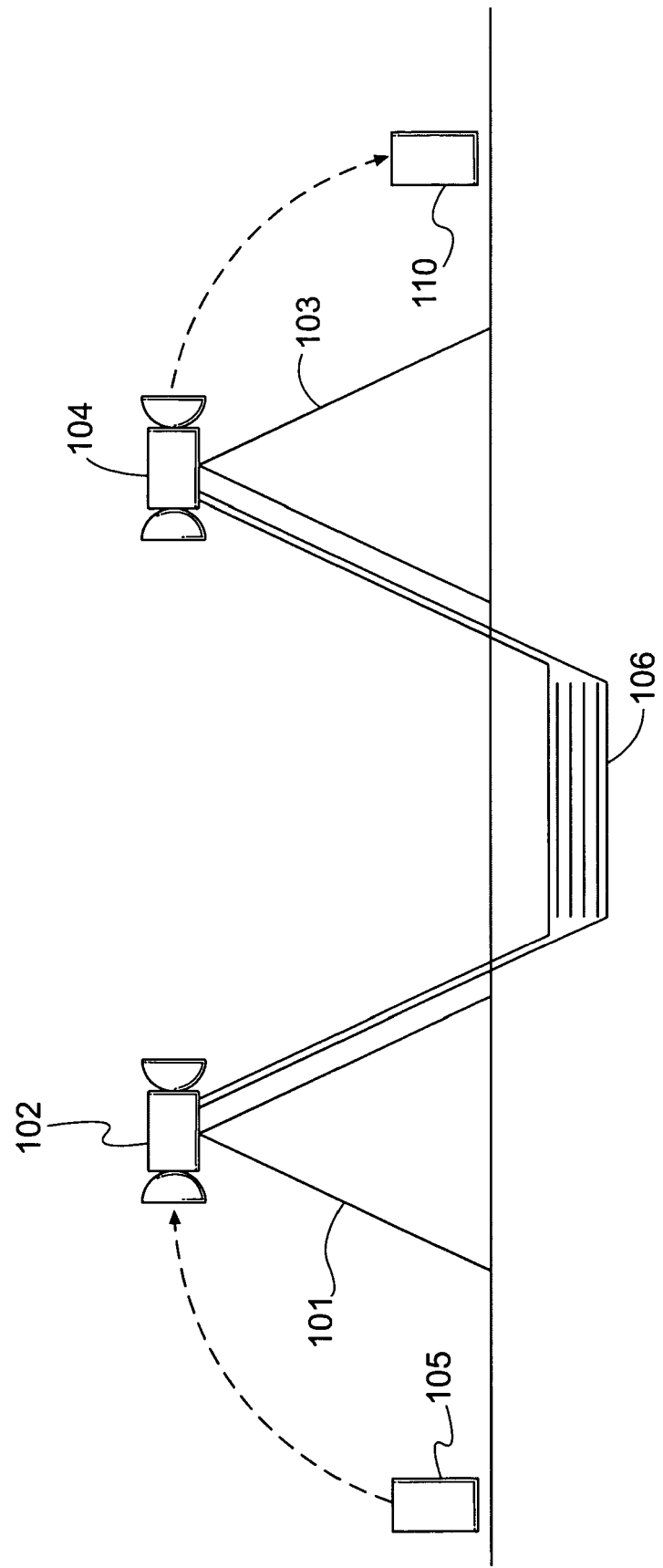
FIG. 1C is a block diagram illustrating a communication system including the transmitter and the receiver communicating via a material transmission system according to an embodiment of the invention.

FIG. 1C is a block diagram illustrating a communication system 100 including a first cellular tower 101 having a first transceiver 102, a second cellular tower 103 having a second transceiver 104, the transmitter 105, the receiver 110 and a material transmission system 106. The communication system 100 uses a material transmission system 106, which can be a fiber-optic system or a wired system (e.g., power lines, cables or telephone lines), to transmit the data (e.g., IP based data such as voice over IP) from the first transceiver 102 to the second transceiver 104 and vice versa. For example, the fiber-optic system generally includes twice the number of fiber optic cables, lines or links as the number of channels. The transmitter 105 transmits the data to the first transceiver 102, which organizes the data into multiple channels and sends the data over multiple fiber optic lines to the second transceiver 104. The second transceiver 104 receives the data, processes the data and sends the data to the receiver 110.

Figure 1D:
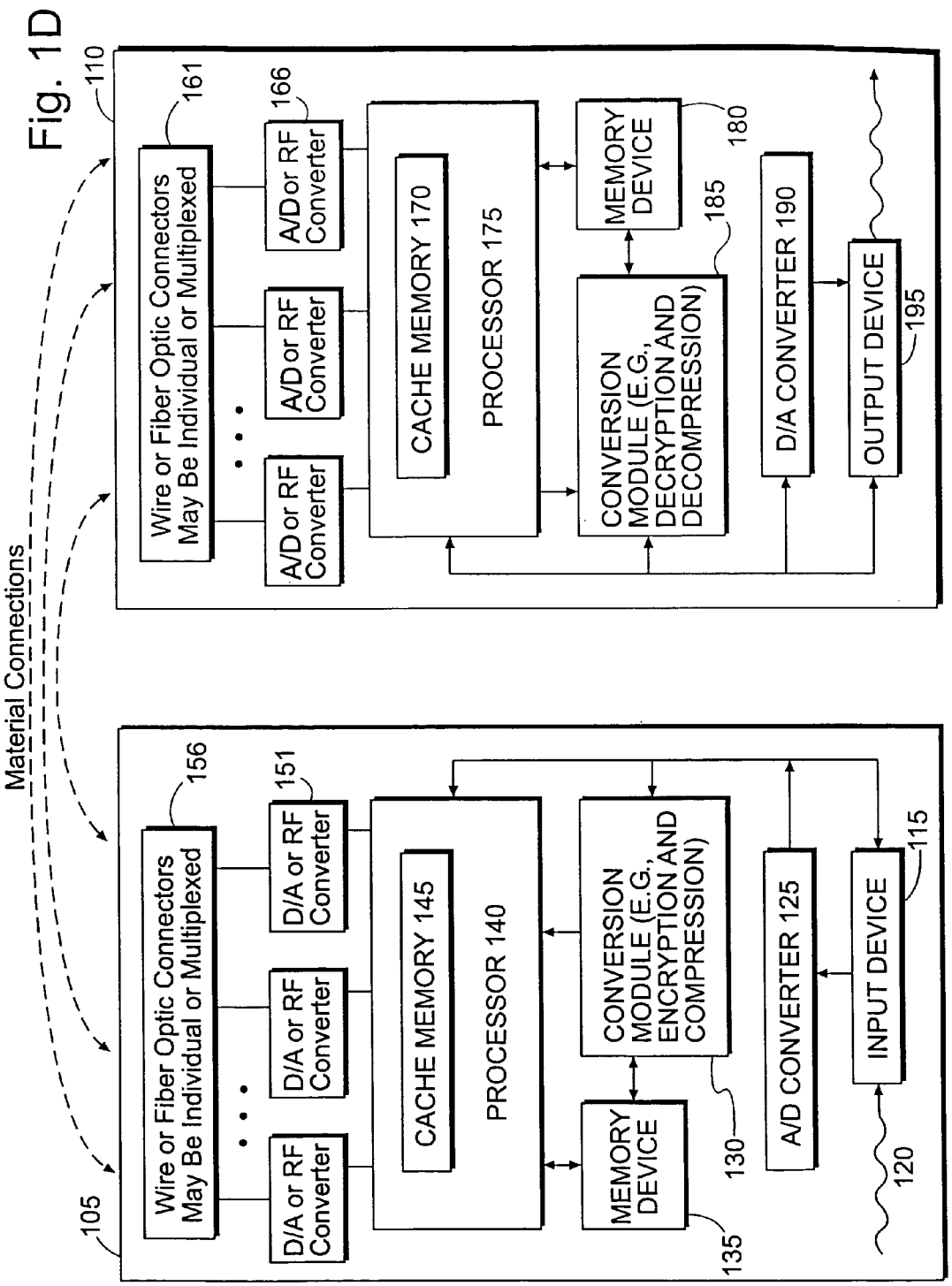
FIG. 1D is a block diagram of a communication system including the transmitter and the receiver communicating via the material transmission system shown in FIG. 1C according to an embodiment of the invention.

FIG. 1D is a block diagram of a communication system 100 including the transmitter 105 and the receiver 110 communicating via the material transmission system shown in FIG. 1C. In the communication system of FIG. 1D, the transmitter 105 includes a D/A or RF converter 151 and a connector 156 and the receiver 110 include a A/D or RF converter 166 and a connector 161. The connectors 156, 161 can receive a single wire or fiber for each channel or frequency. Thus, the connectors 156, 161 can receive multiple wires or fibers where a single frequency is transmitted along each wire or fiber. Alternatively, the connectors 156, 161 can receive a single wire or fiber, which can propagate multiple frequency signals along the single wire or fiber. The number of frequencies that are transmitted along the single wire or fiber is generally equal to the number of channels used to transmit the data. The connectors 156, 161 can include a multiplexer to parse the signals and direct each signal to its corresponding D/A (or A/D) or RF converter 151, 166.

Figure 12:
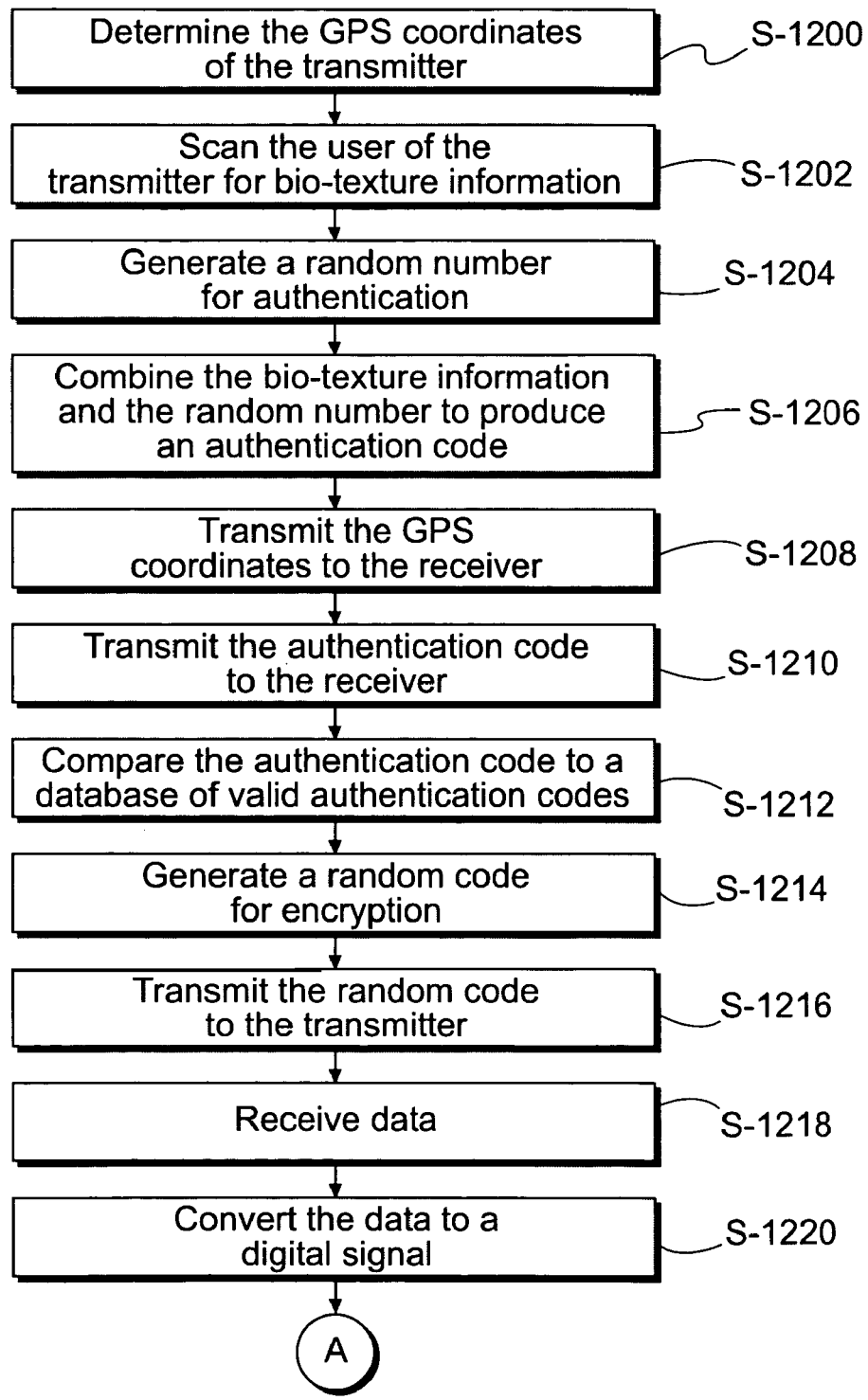
FIG. 12 is a simplified flowchart illustrating a method of organizing the data in a parallel format and transmitting the data on multiple channels according to an embodiment of the invention.
Figure 12:
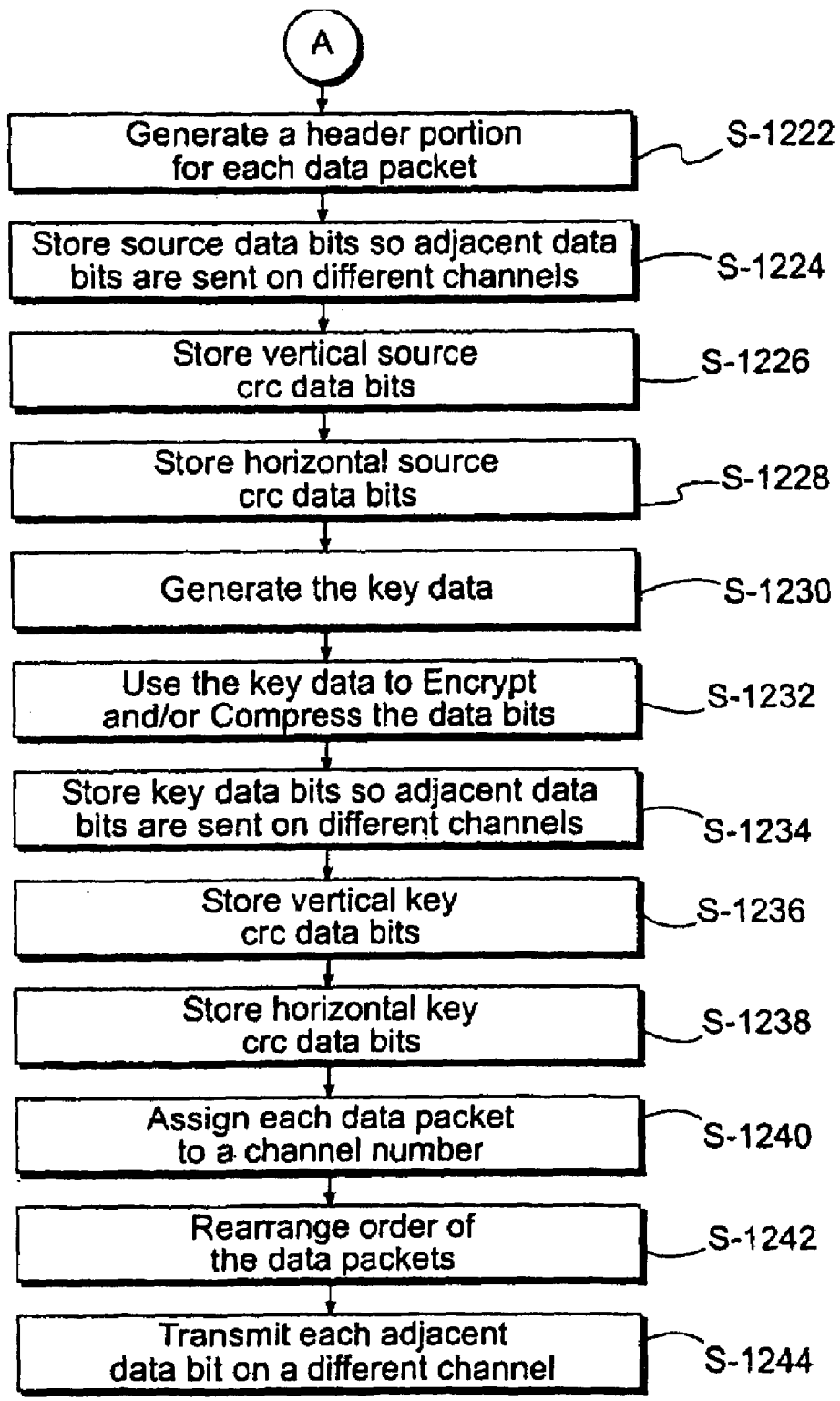
Figure 16:
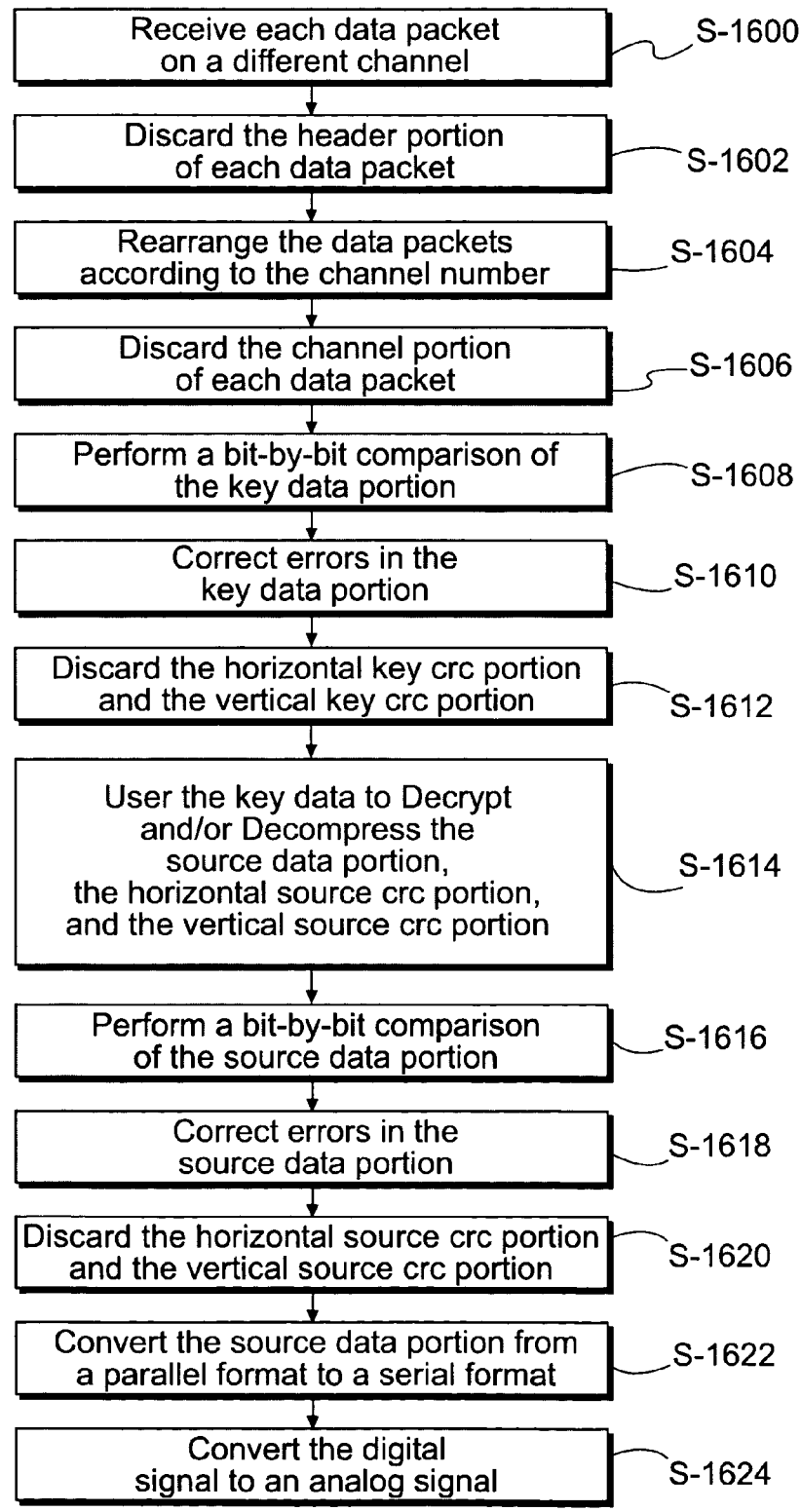
FIG. 16 is a simplified flowchart illustrating a method of receiving the data in a parallel format on multiple channels and correcting the errors in the data according to an embodiment of the invention.

Referring to FIGS. 1A and 12, after power up of the transmitter 105 and the receiver 110, for purposes of identification, location and system routing, the transmitter 105 computes or determines its GPS coordinates (S-1200). The GPS position is provided by a space based GPS satellite system or GPS repeaters positioned on the base stations, the cellular tower 101 or 103, the transmitter 105, the transceiver 107 or the airship 108. In one embodiment, the transmitter 105 scans its user for authentication information, for example, by requesting bio-texture information (e.g., facial, iris, fingerprint, or voice data) from the user (S-1202) and/or generating a random number for encryption (S-1204). That is, the processor 140 includes a random number generator that generates a sequence of random numbers. The transmitter 105 combines the bio-texture information (sometimes referred to as a private key) and the random number (sometimes referred to as a public key) to produce an authentication code (S-1206). Each transmitter 105 and/or user has its own unique bio-texture information and random number to enhance the security of the data. Combining the bio-texture information and the random number further enhance the security of the authentication process by providing a unique and secure authentication code. The transmitter 105 transmits its GPS coordinates (S-1208) and the authentication code (S-1210) to the receiver 110. Each receiver 110 maintains a database of valid authentication codes.

The receiver 110 compares the authentication code to its database of valid authentication codes for a match (S-1212). If the data matches, the receiver 110 generates a random code for encryption (S-1214) and transmits the random code to the transmitter 105 (S-1216). At this point, authentication is complete. If the data does not match, the authentication is denied and the receiver 110 is unable to receive any data from the transmitter 105.

The input device 115 (e.g., a microphone) receives a signal 120 from a human capable of generating an analog signal or a device capable of generating a digital signal (S-1218). If the signal is an analog signal, the input device 115 routes the signal to the A/D converter 125 for conversion to a digital signal (S-1220). If the signal is a digital signal, the input device 115 routes the digital signal to the processor 140. If the transmitter 105 is a transceiver, the input device 115 is an input/output device capable of receiving and transmitting data.

The processor 140 may receive the digital signal from the input device 115 or the A/D converter 125. The processor 140 may be a central processing unit (CPU), digital signal processor (DSP), a controller or any other device capable of processing (e.g., reading, writing, storing, etc.) data. The processor 140 can be implemented using hardware, software or combinations thereof. The processor 140 may include a cache memory 145 for storing the digital signal in a parallel format so the data can be sent to the transmitter 110. The cache memory 145 can be RAM, FLASH memory, or any other type of writable memory device. As the digital signal is received as a stream of data bits, the processor 140 arranges the data bits in a parallel format in the cache memory 145. For illustrative purposes, the data bits are arranged in a parallel format as a data block 200, an example of which is shown in FIG. 2.

FIG. 2 is a block diagram of the data block 200 that contains data bits that are stored contiguously and/or non-contiguously in the cache memory 145. The data block 200 is formed by arranging the data bits of the digital signal in a parallel format to allow the data bits to be sent from the receiver 105 to the transmitter 110 on multiple channels at about the same time. In one embodiment, the data block 200 includes a header portion 205, a channel portion 210, a source data portion 215, a key data portion 220, a horizontal source crc portion 225, a vertical source crc portion 230, a horizontal key crc portion 240, and a vertical key crc portion 235. Some portions may include the same or a different number of bits as other portions.

For illustrative purposes, the data block 200 and each portion is shown and described as having a number of rows and columns of data bits. Each row of the data block 200 may be referred to as a data packet. The size of the data block 200 and each portion can vary depending on the application. In various embodiments, the data block 200 and each portion can include any number of data bits. For example, each portion may include one or more kilobits (or kilobytes) or megabits (or megabytes) of data and the data block 200 may include one or more gigabits (or gigabytes) of data.

As the stream of data bits are received, the processor 140 generates the header portion 205 for each data packet (i.e., each channel) (S-1222). Typically, the header portion 205 is the same for each data packet. In one embodiment, the header portion 205 includes 216 data bits where 104 data bits are used to represent the IP address 305 of the receiver 110 (also see FIG. 3) and 112 data bits are used to represent the GPS position 405 of the transmitter 105 (also see FIG. 4). Preferably, the GPS position 405 includes latitude and longitude information in degrees, minutes and seconds where 56 data bits are used to represent the latitude information and 56 data bits are used to represent the longitude information. For more accuracy, the GPS position 405 can include altitude information in degrees, minutes and seconds where 56 data bits are used to represent the altitude information. For even more accuracy, additional data bits can be used to represent the GPS position 405, for example, the seconds can be represented as 10th, 100th, or 1000th of a second. In one embodiment, the GPS position 405 is part of the source data portion 215 to provide encryption for the GPS position 405.

FIG. 5 is a simplified representation of the data block 200 of FIG. 2, without the header portion 205, to illustrate the channel portion 210. For illustrative purposes, the data block 200 includes 896 data bits that are organized into 16 data packets (i.e., 16 rows) where each data packet includes 56 bits (i.e., 56 columns). Hence, since 16 data packets are shown in FIG. 5, 16 channels are used to transmit the data packets. Each data packet represents data that is to be transmitted via a single channel. In one embodiment, the data block 200 includes 128 data packets where each data packet includes 512 bits for a total of 65,536 bits. The channel portion 210 is represented by the "x" data bits in columns 49 through 56 of the data block 200. In the illustrated embodiment, the most significant bits (msb) are the bits in column 49 and the least significant bits (lsb) are the bits in column 56. Since there are 8 channel data bits for each data packet, the channel portion 210 can uniquely identify up to 256 data packets. Therefore, the data block 200 can be transmitted using up to 256 channels.

FIG. 6A is a simplified representation of the data block 200 of FIG. 2, without the header portion 205, to illustrate the source data portion 215. The processor 140 receives the data bits and using the data bits, creates the data block 200 in the cache memory 145. The processor 140 creates the data block 200 so that each data packet is capable of being transmitted on a single channel of the communication system 100. In one embodiment, the processor 140 stores the data bits in the cache memory 145 so that adjacent data bits are to be transmitted on different channels (S-1224). That is, the processor 140 assigns the first data bit to the first data packet (i.e., channel 0), the second data bit to the second data packet (i.e., channel 1), the third data bit to the third data packet (i.e., channel 2), and so on. Hence, the processor 140 stores the data bits into the cache memory 145 for transmission via multiple channels. In one embodiment, the source data bits are mapped in vertically.

FIG. 6B shows the word "Hello" vertically mapped into the source data portion 215. That is, the first 8 data bits are 01001000, which correspond to the letter "H" and are vertically mapped into the source data portion 215 such that the 0 is the first bit and corresponds to channel 0, the 1 is the second bit and corresponds to channel 1, the 0 is the third bit and corresponds to channel 2, and so on.

After the first 8 data bits are stored as channels 0-7, the same first 8 data bits are stored as channels 8-15, which correspond to the vertical source crc portion 230 (see FIG. 7A) (S-1226). Similarly, after the second 8 data bits are stored as channels 0-7, the same second 8 data bits are stored as channels 8-15. The processor 140 continues to store the next 8 data bits as channels 0-7, and store the same 8 data bits as channels 8-15 until the source data portion 215 and the vertical source crc portion 230 are filled with data bits. Hence, the vertical source crc data bits are also mapped in vertically. FIG. 7B shows the word "Hello" vertically mapped into the vertical source crc portion 230.

The vertical source crc data bits are transmitted on different channels from the source data bits to advantageously provide enhanced reliability during transmission and to avoid having to retransmit the entire data block 200 if one or more of the channels not operating correctly. For example, if there is a problem with transmitting on channel 1, then the vertical source crc data bits on channel 9 will not have the same problem because these data bits are transmitted on a different channel. Therefore, one advantage of the arrangement of the data block 200 is that if certain channels have transmission problems, the vertical crc data bits will be able to correct the errors at the receiver 110 without the transmitter 105 having to retransmit the data block 200. This is because the vertical source crc portion 230 is sent on different channels when compared to the source data portion 215.

Figure 8A:
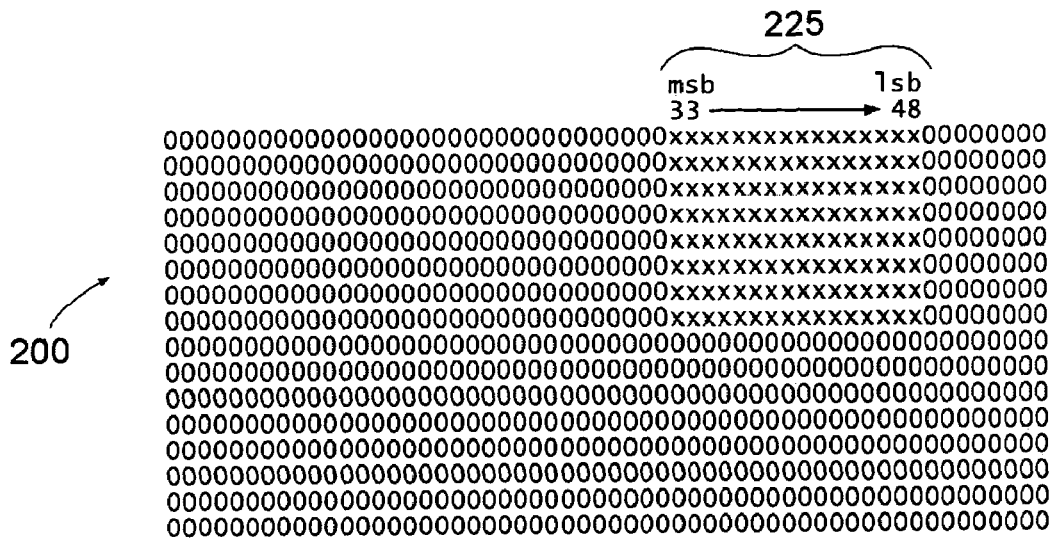
FIG. 8A is a simplified representation of the data block of FIG. 2, without the header portion, to illustrate the horizontal source crc portion according to an embodiment of the invention.

FIG. 8A is a simplified representation of the data block 200 of FIG. 2, without the header portion 205, to illustrate the horizontal source crc portion 225. The processor 140 horizontally copies or maps the source data portion 215 to the horizontal source crc portion 225 (S-1228). In one embodiment, the processor 140 copies the first channel data (e.g., 16 bits from channel 0) of the source data portion 215 to the first channel data of the horizontal source crc portion 225. Thereafter, the processor 140 copies the second channel data (e.g., 16 bits from channel 1) of the source data portion 215 to the second channel data of the horizontal source crc portion 225. The processor 140 continues to copy the (e.g., third, fourth, etc.) channel data from the source data portion 215 to the horizontal source crc portion 225 until the horizontal source crc portion 225 is filled with data.

FIG. 8B shows the word "Hello" horizontally mapped into the horizontal source crc portion 225. That is, the processor 140 copies the first channel data (e.g., 00000) of the source data portion 215 to the first channel data of the horizontal source crc portion 225. Thereafter, the processor 140 copies the second channel data (e.g., 11111), the third channel data (e.g., 01111), the fourth channel data (e.g., 00000), and so on, of the source data portion 215 to the second channel data, the third channel data, the fourth channel data, and so on, of the horizontal source crc portion 225. The processor 140 horizontally copies or maps the source data portion 215 to the horizontal source crc portion 225 until the horizontal source crc portion 225 is filled with data.

The horizontal source crc data bits are transmitted at a different time than the source data bits to advantageously provide enhanced reliability during transmission and to avoid having to retransmit the entire data block 200 if there is a drop or loss in signal at a particular time. For example, if there is a drop or loss in signal strength when the column 4 bits are being sent, then the same data is on column 36 so the retransmission of the source data bits is not needed because the data bits are repeated by the horizontal source crc data bits. Therefore, one advantage of the arrangement of the data block 200 is that if the signal contained in the source data portion 215 is lost or dropped, the horizontal crc data bits will be able to correct the errors at the receiver 110 without the transmitter 105 having to retransmit the data block 200. This is because the horizontal source crc portion 225 is shifted in time compared to the source crc portion 215.

The random code received from the receiver 110 is used by the transmitter 105 to form the key data, which is stored in the key data portion 220 (S-1230). In one embodiment, the random code is equal to the key data. In another embodiment, the processor 140 combines the random code with a random offset to form the key data. The random offset may be, for example, 1, 2, 3, etc. The random offset may also be randomly or pseudo-randomly generated. The random offset provides the key data with additional encryption.

The conversion module 130 uses the key data to encrypt and compress the source data portion 215, the horizontal source crc portion 225, and the vertical source crc portion 230 (S-1232). The conversion module 130 may encrypt and compress these portions using known encryption techniques such as PGP and known compression techniques such as JPEG or MPEG, respectively. Preferably, the encrypted and compressed portions are routed to the processor 140 and stored in the cache memory 145. Alternatively, the conversion module 130 may route the encrypted and compressed portions to the memory module 135 for storage of the data for use at a later time. The memory module 135 may be random access memory (RAM), FLASH memory or any other type of writable memory device.

Figure 9:
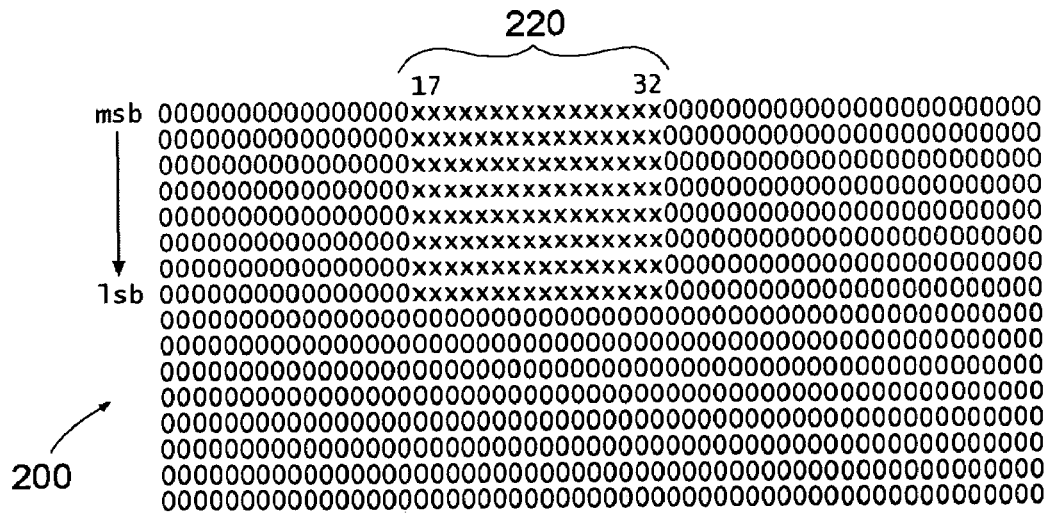
FIG. 9 is a simplified representation of the data block of FIG. 2, without the header portion, to illustrate the key data portion according to an embodiment of the invention.
Figure 10:
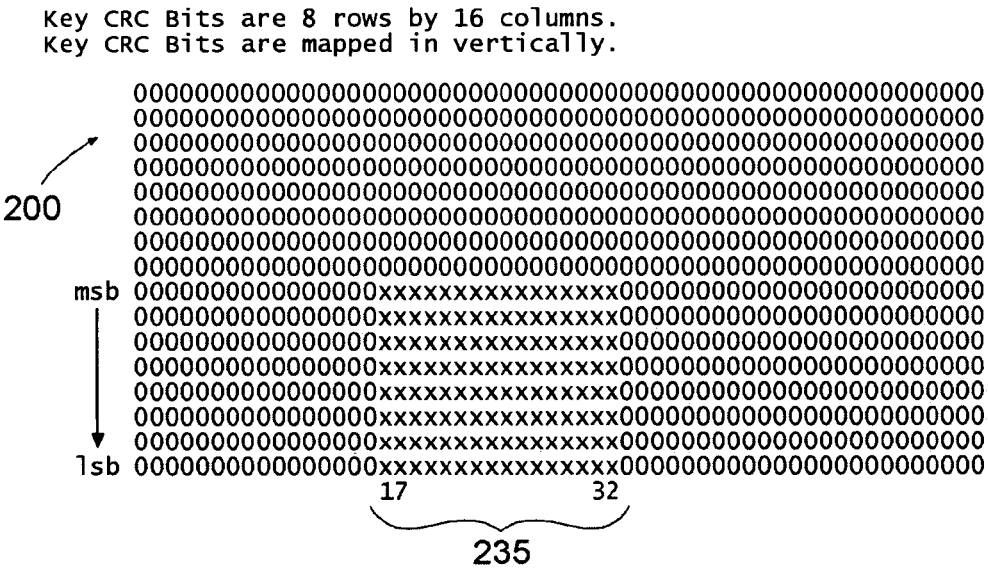
FIG. 10 is a simplified representation of the data block of FIG. 2, without the header portion, to illustrate the vertical key crc portion according to an embodiment of the invention.

FIG. 9 is a simplified representation of the data block 200 of FIG. 2, without the header portion 205, to illustrate the key data portion 220. The key data bits are stored or vertically mapped into the key data portion 220, for example, to the first channel, then the second channel, then the third channel, and so on (S-1234). Hence, the first data bit is assigned to the first data packet, the second data bit is assigned to the second data packet, and so on. In one embodiment, the encrypted key data bits are stored or mapped into the key data portion 220. After the first 8 data bits are stored as channels 0-7, the same first 8 data bits are stored as channels 8-15, which correspond to the vertical key crc portion 235 (see FIG. 10) (S-1236). Similarly, after the second 8 data bits are stored as channels 0-7, the same second 8 data bits are stored as channels 8-15. The processor 140 continues to store the next 8 data bits as channels 0-7, and store the same 8 data bits as channels 8-15 until the key data portion 220 and the vertical key crc portion 235 are filled with data bits. Hence, the key data bits and the vertical key crc data bits are mapped in vertically.

Figure 11:
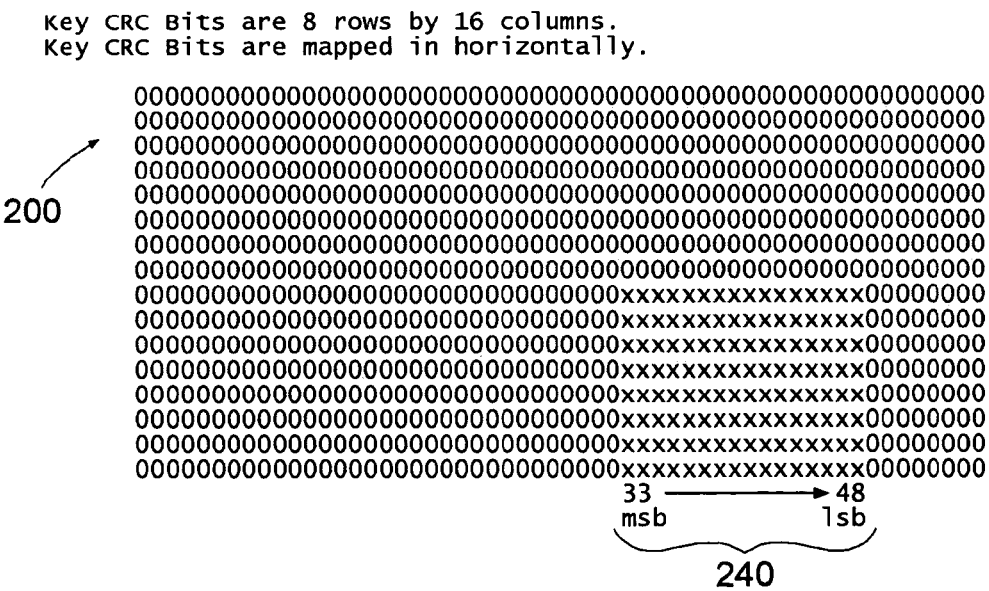
FIG. 11 is a simplified representation of the data block of FIG. 2, without the header portion, to illustrate the horizontal key crc portion according to an embodiment of the invention.

FIG. 11 is a simplified representation of the data block 200 of FIG. 2, without the header portion 205, to illustrate the horizontal key crc portion 240. The processor 140 horizontally copies or maps the key data portion 220 to the horizontal key crc portion 240 (S-1238). In one embodiment, the processor 140 copies the first channel data (e.g., 16 bits from channel 0) of the key data portion 220 to the first channel data of the horizontal key crc portion 240. Thereafter, the processor 140 copies the second channel data (e.g., 16 bits from channel 1) of the key data portion 220 to the second channel data of the horizontal key crc portion 240. The processor 140 continues to copy the (e.g., third, fourth, etc.) channel data from the key data portion 220 to the horizontal key crc portion 240 until the horizontal key crc portion 240 is filled with data.

The processor 140 assigns each data packet to a channel number (S-1240). Initially, the first data packet is assigned to channel 0, the second data packet is assigned to channel 1, the third data packet is assigned to channel 2, and so on. Hence, the data packets are initially arranged in a sequential order, that is, channel 0, channel 1, channel 2, and so on. In one embodiment, the processor 140 generates the channel number and then stores the data bits into the cache memory 145 one channel at a time. For illustrative purposes, the channel bits are mapped in horizontally.

Now, the processor 140 randomly or pseudo-randomly rearranges the order of the data packets in the cache memory 145 (S-1242). Since the data block 200 includes 16 channels, the ordering of the 16 channels are pseudo-randomly rearranged in the cache memory 145. As an example, the ordering of the channels may be 0, 12, 10, 11, 9, 3, 15, 4, 5, 1, 7, 13, 8, 6, 2, and 14. The entire data block 200 is now filled with data bits.

Referring back to FIG. 1A, the transmitter 105 includes a number of chip radios 150 connected to the cache memory 145 and a number of antennas 155 connected to the number of chip radios 150, respectively. Preferably, the transmitter 105 has the same number of chip radios 150 as antennas 155. In one embodiment, each chip radio 150 is a single channel transceiver chip radio and is pre-programmed to a specific unique frequency. Each chip radio 150 has a different frequency to avoid signal interference. In one embodiment, each antenna is a patch antenna.

Once the entire data block 200 is created, the processor 140 passes each data packet, bit-by-bit, to a corresponding chip radio 150, which transmits the data packet to the receiver 110 via a corresponding antenna 155 (S-1244). In the illustrated embodiment, since there are 16 data packets, 16 channels are simultaneously used to transmit the 16 data packets to the receiver 110. That is, the first bit (followed by the second bit, the third bit and so on) of each data packet is simultaneously sent on different channels to the receiver 110. In one embodiment, the data block 200 include 128 data packets, and the processor 140 sends each data packet using 1 of the 128 patch antennas over 1 of the 128 channels. Therefore, a bit of each data packet can be simultaneously sent to the receiver 110 using the 128 patch antennas over the 128 channels. Hence, the processor 140 transmits the entire data block 200 using multiple channels to the receiver 110.

FIG. 13 is a simplified representation of a data block 1300, without the header portion 205, received by the receiver 110. As shown, the channel data 210 is arranged in the order: 0, 12, 10, 11, 9, 3, 15, 4, 5, 1, 7, 13, 8, 6, 2, and 14. For illustrative purposes, the source data portion 215 of the data block 1300 includes the word "Hello" in an encrypted format. The receiver 110 includes a number of antennas 160 for receiving the data packets (i.e., data block 1300) on a number of different channels (S-1600). In one embodiment, each antenna is a patch antenna. Preferably, the number of antennas 160 is equal to the number of antennas 155. Each antenna 160 receives a data packet and transfers the data packet to a corresponding chip radio 165, which is connected to a cache memory 170 and/or a processor 175. The cache memory 170 can be RAM, FLASH memory, or any other type of writable memory device. In one embodiment, each chip radio 165 is a single channel transceiver chip radio and is pre-programmed to a specific unique frequency that is the same as the frequency of a corresponding chip radio 150. Each set of chip radios 150, 165 has a unique frequency to ensure transmission and receipt of the data packets. The cache memory 170 and/or the processor 175 receive the data packets from the chip radios 165. The processor 175 may be a CPU, DSP, a chip, a controller or any other device capable of processing (e.g., reading, writing, storing, etc.) data. The processor 175 can be implemented using hardware, software, or combinations thereof.

FIG. 14 is a simplified representation of the data block of FIG. 13 rearranged according to channel number and showing the errors detected by the bit-by-bit comparison. Upon receiving the data packets from the chip radios 165, the processor 175 discards the header portion 205 of each data packet (S-1602), rearranges the data packets in sequential order according to the channel number (S-1604) and discards the channel portion 210 of each data packet (S-1606). Hence, the source data portion 215 and the key data portion 220 are now arranged in the proper order. The process of rearranging the data packets in a particular order is sometimes referred to as normalization of the channels.

The processor 175 checks for errors in the key data portion 220 by doing a bit-by-bit compare of the data bits in the key data portion 220 to the data bits in the horizontal key crc portion 240 and the vertical key crc portion 235 (S-1608). As illustrated in FIG. 14, the processor 175 detected an error at row 6, column 18 (row 0 is the first row and column 0 is the first column). That is, this bit in the key data portion 220 is a 1 and the corresponding bits in the horizontal key crc portion 240 and the vertical key crc portion 235 are both 0's. This means that the bit in the key data portion 220 is incorrect. The processor 175 changes the bit in the key data portion 220 to a 0 because the vertical and horizontal key crc portions 235, 240 are the same (S-1610). If the data bit in the key data portion 220 is the same as one or both of the bits in the horizontal key crc portion 240 and the vertical key crc portion 235, then the processor 175 does not change the data bit in the key data portion 220. If the key data portion 220 includes one or more errors, the processor 175 can correct these error bits without retransmission of the data block 200 as long as at least one of the corresponding bits in the horizontal key crc portion 240 and the vertical key crc portion 235 is correct. Once the key data portion 220 has been corrected, the processor 175 discards the horizontal key crc portion 240 and the vertical key crc portion 235 (S-1612).

The conversion module 185 uses the key data to decrypt and decompress the source data portion 215, the horizontal source crc portion 225, and the vertical source crc portion 230 (S-1614). The conversion module 185 may decrypt and decompress the source data portion 215 using known decryption techniques such as PGP and known decompression techniques such as JPEG or MPEG, respectively. The conversion module 185 may route the source data to the memory module 180 for storage of the data for use at a later time or to a digital-to-analog (D/A) converter 190.

The processor 175 checks for errors in the source data portion 215 by doing a bit-by-bit compare of the data bits in the source data portion 215 to the data bits in the horizontal source crc portion 225 and the vertical source crc portion 230 (S-1616). As illustrated in FIG. 14, the processor 175 detected an error at row 2, column 2. That is, this bit in the source data portion 215 is a 0 and the corresponding bits in the horizontal source crc portion 225 and the vertical source crc portion 230 are both 1's. This means that the bit in the source data portion 215 is incorrect. The processor 175 changes the bit in the source data portion 215 to a 1 because the vertical and horizontal source crc portions 230, 225 are the same (S-1618). If the data bit in the source data portion 215 is the same as one or both of the bits in the horizontal source crc and vertical source crc portions 225, 230, then the processor 175 does not change the data bit in the source data portion 215. Hence, if the source data portion 215 includes one or more errors, the processor 175 can correct these error bits without retransmission of the data block 200 as long as at least one of the corresponding bits in the horizontal source crc portion 225 and the vertical source crc portion 230 is correct. Once the source data portion 215 has been corrected, the processor 175 discards the horizontal source crc portion 225 and the vertical source crc portion 230 (S-1620). FIG. 15 is a simplified representation of the data block of FIG. 14 showing the errors corrected.

The processor 175 can build another data block and retransmit the new data block to another receiver. To build a new data block, the processor 175 implements S-1600 to S-1616 and S-1622 to S-1644. Alternatively, if the receiver 110 is the final recipient of the data, the processor 175 converts the source data portion 215 from a parallel format to a serial format by reading one bit at a time from each data packet of the source data portion 215 (S-1622). For example, the processor 175 reads the first data bit from the first data packet, the first data bit from the second data packet, and so on. Hence, the processor 215 retrieves the data bits in a serial manner to form a digital signal.

The D/A converter 190 converts the digital signal to an analog signal, which is transmitted to an output device 195 (e.g., a speaker) for converting the analog signal into a form that can be heard by a human (S-1624). If the receiver 110 is a transceiver, the output device 195 is an input/output device capable of receiving and transmitting data.

Although an exemplary embodiment of the invention has been shown and described, many other changes, combinations, omissions, modifications and substitutions, in addition to those set forth in the above paragraphs, may be made by one having skill in the art without necessarily departing from the spirit and scope of this invention. Accordingly, the invention is not intended to be limited by the preferred embodiments, but is to be defined by reference to the appended claims.

What is claimed is:

1. A method for simultaneously transmitting data bits using multiple channels, comprising:
serially receiving a plurality of source data bits;
arranging the plurality of source data bits so that adjacent source data bits are to be transmitted on a different channel;
transmitting the plurality of source data bits on a plurality of first channels;
copying the plurality of source data bits to form a plurality of vertical source crc data bits; and
transmitting the plurality of vertical source crc data bits on a plurality of second channels.

2. The method of claim 1, further comprising correcting at least one of the plurality of source data bits without retransmission of the plurality of source data bits.

3. The method of claim 1, wherein the plurality of source data bits are transmitted at about the same time as the plurality of vertical source crc data bits.

4. The method of claim 1, further comprising performing a bit-by-bit comparison of the plurality of source data bits and the plurality of vertical source crc data bits to detect and correct errors.

5. The method of claim 1, further comprising copying the plurality of source data bits to form a plurality of horizontal source crc data bits and transmitting the plurality of horizontal source crc data bits on the plurality of first channels.

6. The method of claim 5, wherein the plurality of source data bits are transmitted in a time shifted manner when compared to the plurality of horizontal source crc data bits.

7. The method of claim 5, further comprising performing a bit-by-bit comparison of the plurality of source data bits and the plurality of horizontal source crc data bits to detect and correct errors.

8. The method of claim 1, further comprising receiving bio-texture information from a user, generating a random number and combining the bio-texture information and the random number to form an authentication code.

9. The method of claim 8, further comprising transmitting the authentication code to a receiver, comparing the authentication code to a list of codes stored at the receiver and receiving a random code from the receiver.

10. A method for multi-link communications, comprising:
receiving a plurality of serial data bits;

arranging the plurality of serial data bits into a source data portion;

copying the source data portion to form a vertical source crc portion;

copying the source data portion to form a horizontal source crc portion;

transmitting the source data portion using a plurality of first links;

transmitting the vertical source crc portion using a plurality of second links; and transmitting the horizontal source crc portion using the plurality of first links.

11. The method of claim 10, wherein the source data portion is transmitted at about the same time as the vertical source crc portion.

12. The method of claim 10, wherein the source data portion is transmitted at a different time as the horizontal source crc portion.

13. The method of claim 10, wherein the plurality of first links and the plurality of second links are coaxial cables.

14. The method of claim 10, wherein the plurality of first links and the plurality of second links are fiber-optic lines.

15. A method for simultaneously transmitting data bits using multiple channels, comprising:

serially receiving a plurality of source data bits;

arranging the plurality of source data bits so that adjacent source data bits are to be transmitted on a different channel;

transmitting the plurality of source data bits on a plurality of first channels;

copying the plurality of source data bits to form a plurality of horizontal source crc data bits; and transmitting the plurality of horizontal source crc data bits on a plurality of second channels.

16. The method of claim 15, further comprising correcting at least one of the plurality of source data bits without retransmission of the plurality of source data bits.

17. The method of claim 15, further comprising copying the plurality of source data bits to form a plurality of vertical source crc data bits and transmitting the plurality of vertical source crc data bits on a plurality of second channels.

18. The method of claim 17, wherein the plurality of source data bits are transmitted at about the same time as the plurality of vertical source crc data bits.

19. The method of claim 17, further comprising performing a bit-by-bit comparison of the plurality of source data bits and the plurality of vertical source crc data bits to detect and correct errors.

20. The method of claim 15, wherein the plurality of source data bits are transmitted in a time shifted manner when compared to the plurality of horizontal source crc data bits.

21. The method of claim 15, further comprising performing a bit-by-bit comparison of the plurality of source data bits and the plurality of horizontal source crc data bits to detect and correct errors.

22. The method of claim 15, further comprising receiving bio-texture information from a user, generating a random number and combining the bio-texture information and the random number to form an authentication code.

23. The method of claim 22, further comprising transmitting the authentication code to a receiver, comparing the authentication code to a list of codes stored at the receiver and receiving a random code from the receiver.

24. A method for simultaneously transmitting data bits using multiple channels, comprising:

serially receiving a plurality of source data bits;

arranging the plurality of source data bits so that adjacent source data bits are to be transmitted on a different channel;

transmitting the plurality of source data bits on a plurality of first channels;

receiving bio-texture information from a user, generating a random number and combining the bio-texture information and the random number to form an authentication code; and transmitting the authentication code to a receiver, comparing the authentication code to a list of codes stored at the receiver and receiving a random code from the receiver.

* * * * *